United States Patent
Tsukui

(10) Patent No.: US 7,522,777 B2
(45) Date of Patent: Apr. 21, 2009

(54) IMAGE SENSING APPARATUS AND CONTROL METHOD THEREOF

(75) Inventor: Katsuyuki Tsukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 10/867,351

(22) Filed: Jun. 14, 2004

(65) Prior Publication Data
US 2005/0007466 A1   Jan. 13, 2005

(30) Foreign Application Priority Data
Jun. 27, 2003   (JP) ............................... 2003-185387

(51) Int. Cl.
*G06K 9/36* (2006.01)
*G06K 9/46* (2006.01)

(52) U.S. Cl. ....................... 382/240; 382/239
(58) Field of Classification Search ........................ None
See application file for complete search history.

(56) References Cited

U.S. PATENT DOCUMENTS

| | | | |
|---|---|---|---|
| 5,262,871 A * | 11/1993 | Wilder et al. ................ 348/307 |
| 6,038,365 A * | 3/2000 | Yamagami ..................... 386/46 |
| 6,633,676 B1 * | 10/2003 | Kleihorst et al. ............. 382/236 |
| 7,016,525 B2 * | 3/2006 | Gladnick ..................... 382/141 |
| 7,088,870 B2 * | 8/2006 | Perez et al. ................... 382/284 |
| 7,127,117 B2 * | 10/2006 | Sano et al. ................... 382/240 |
| 7,146,032 B2 * | 12/2006 | Jung et al. ................... 382/132 |
| 7,200,272 B2 * | 4/2007 | Ishikawa ..................... 382/233 |
| 2004/0017481 A1 * | 1/2004 | Takasumi et al. ...... 348/207.99 |

FOREIGN PATENT DOCUMENTS

JP   11-103460   4/1999

* cited by examiner

*Primary Examiner*—Matthew C Bella
*Assistant Examiner*—Yuzhen Ge
(74) *Attorney, Agent, or Firm*—Cowan, Liebowitz & Latman, P.C.

(57) ABSTRACT

This invention enables deleting and protecting a part of sensed image data in accordance with a situation so as to enable efficient utilization of a finite capacity of a storage medium. To realize this, an image subjected to deletion from the image data stored in a storage medium is selected and displayed in a display unit of a digital camera. If a region of interest (ROI) is set in this image, a user is asked to select the ROI, non-ROI region, or entire image as the deletion target, and the designated region is deleted from the storage medium.

7 Claims, 22 Drawing Sheets

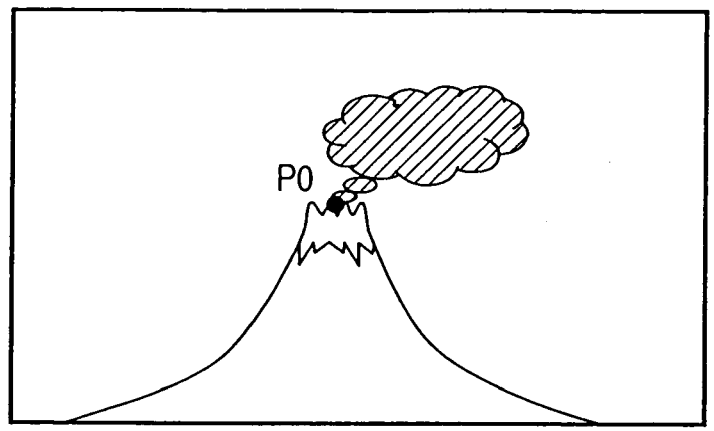
F I G. 13A
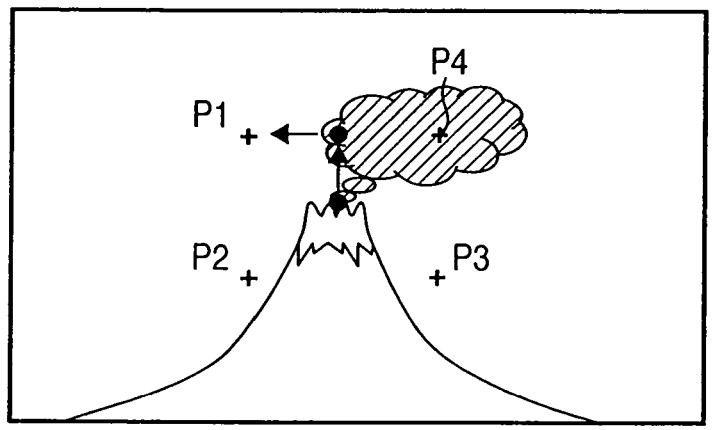
F I G. 13B
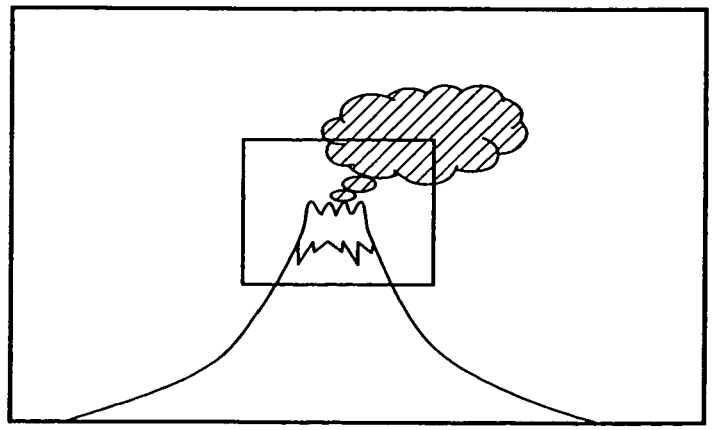
F I G. 13C

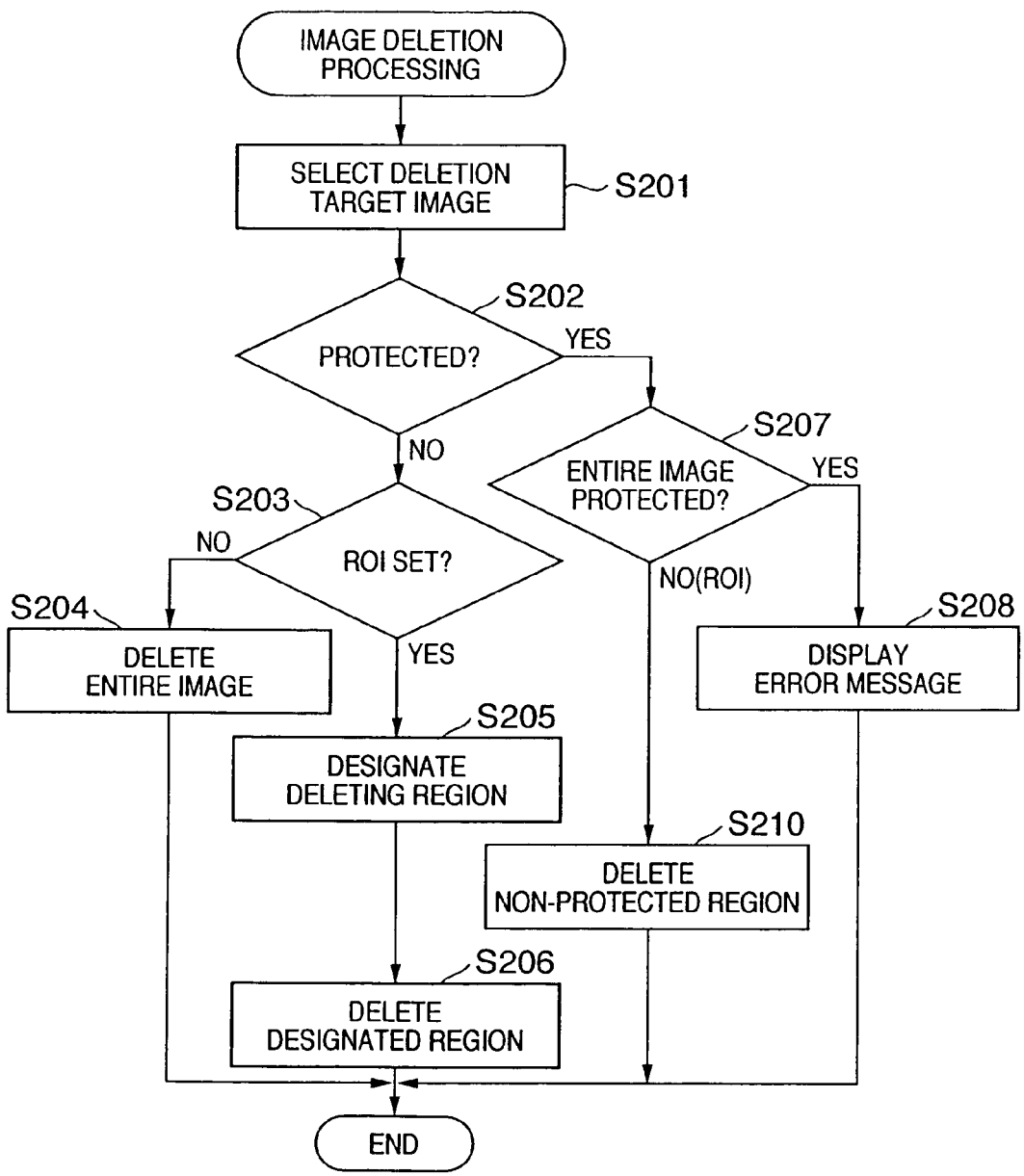
F I G. 17

IMAGE SENSING APPARATUS AND CONTROL METHOD THEREOF

FIELD OF THE INVENTION

The present invention relates to an image compression technique.

BACKGROUND OF THE INVENTION

In rapidly prevailing digital cameras these days, image data obtained by image sensing is subjected to compression by a JPEG (Joint Photographic Coding Experts Group) method, and the compressed image data is stored in a memory card which is an attachable/detachable storage medium.

According to the JPEG method, DPCM (differential pulse-code modulation) is adopted for reversible compression, while DCT (discrete cosine transform) is adopted for irreversible compression. Since the DPCM which is a reversible encoding method does not lose image data, it has excellent image preservability and achieves excellent image quality in a reproduced image. However, compared to the DCT, the DPCM has a lower encoding compression ratio.

On the contrary, in the DCT which is an irreversible encoding method, 8×8-pixel block data is subjected to two-dimensional DCT, then with respect to the coefficient of the transformation non-linear quantization is performed, then AC components are subjected to zigzag scan, and two-dimensional Huffman coding is performed. In the non-linear quantization, fine quantization is performed with respect to a low-frequency component and coarse quantization is performed with respect to a high-frequency component so that image compression can be performed at a high ratio while maintaining reasonable image quality. However, when the image compression ratio is increased, image deterioration (block noise or the like) becomes conspicuous.

Furthermore, in the JPEG method, a uniform quantization table is used for the entire image. Therefore, it is impossible to print a certain area of an image with higher quality than other area of the image. If a user wants to increase the image quality of a particular area of a screen, the user has to increase the quality of the entire image before storage. As a result, the user has no other choice but to reduce the total number of images to be recorded in a memory card.

On the contrary, a so-called JPEG 2000 method is under review as the next-generation compression method. More specifically, image data is broken down to hierarchy data for each of a plurality of resolutions by wavelet transformation or the like, and the broken-down hierarchy data in units of resolution is encoded in order of hierarchy to be compressed and stored as a file (e.g., Japanese Patent Application Laid-Open No. 11-103460). By virtue of the fact that image data is hierarchically encoded, efficient image data transfer is achieved because only the data of necessary resolution can be transferred. Furthermore, an image can be restored without using the encoded data of all the frequency components, but only using the low-resolution data. In other words, the amount of data can easily be reduced by eliminating the high-resolution data.

Furthermore, according to a characteristic aspect of the JPEG 2000, a region of interest (hereinafter referred to as a ROI) is designated in an image, and the image of the ROI can be encoded by a compression coefficient (compression ratio) different from that of the other regions of the image. By employing the compression technique and aspect of the JPEG 2000, it is considered possible to realize a user-friendly digital camera having various functions.

Meanwhile, most of the currently available digital cameras are capable of setting plural levels of recording image quality modes referred to as image sensing modes, e.g., Super Fine (high image quality mode), Fine (medium image quality mode), and Normal (low image quality mode). If the image quality is high, the image size is large. Therefore, selecting image quality means selecting the number of sensing images.

With the current technique, if image data is once sensed and stored in a high image quality mode, it is impossible to lower the image quality of the stored image. In a case where the storage medium inserted in the digital camera runs short of the storage area but there are more objects to be sensed, the image data that has been sensed and stored in the past must be erased, which is problematic to the user.

SUMMARY OF THE INVENTION

The present invention has been proposed in view of the above-described problem, and has as its object to provide a technique for deleting and protecting a part of sensed image data in accordance with a situation so as to enable efficient utilization of a finite capacity of a storage medium.

In order to solve the above-described problems, for instance, an image sensing apparatus according to the present invention has the following configuration.

More specifically, an image sensing apparatus having image sensing means and storing an image sensed by the image sensing means in an attachable/detachable storage medium, comprises:

region designation means for designating a desired region in an image-sensible area;

compression-encoding means for compression-encoding the region, designated by the region designation means, with a different image quality level from other regions of the designated region when an image is sensed by the image sensing means to be stored in the storage medium;

storage means for storing in the storage medium the image that is compression-encoded by the compression-encoding means;

selection means for, in a case where a desired image stored in the storage medium is to be deleted and the region is set in the image, selecting whether the region is to be deleted or a region other than the set region is to be deleted as a deletion target; and deletion means for deleting data corresponding to the deletion target region, selected by the selection means, from the storage medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A to 13C are explanatory views of a high-quality-region designation method according to an embodiment of the present invention;

FIG. 17 is a flowchart describing an image data deleting procedure of a digital camera according to an embodiment of the present invention;

DETAILED DESCRIPTION OF THE PREFERRED EMBODIMENTS

Preferred embodiments of the present invention will now be described in detail in accordance with the accompanying drawings.

<Description of Compression Encoding and Decoding>

First, encoding and decoding according to the present embodiment are described.

Figure 1:
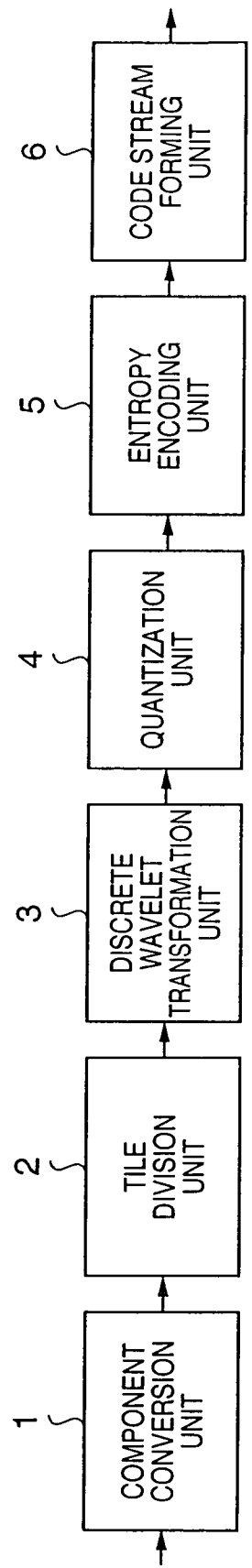
FIG. 1 is a block diagram showing an overall construction of an encoder according to an embodiment of the present invention.

FIG. 1 shows an overall construction of an encoder.

Referring to FIG. 1, image data inputted to the encoder is subjected to color space conversion by a component conversion unit 1. Each of the converted color component data is subjected to predetermined thinning processing as necessary, and outputted. Note that if the image data is a monochrome gray scale image, the component conversion is not necessary. The following description is provided on the processing performed on each of the color components obtained in the foregoing manner.

A tile division unit 2 divides inputted image data into a plurality of rectangular tiles having a predetermined size, and outputs the divided tiles. The size of the tile can be as large as the size of the entire image. In this case, tile division is not actually performed. The following description is provided on the processing performed in units of the tile on each color component obtained in the foregoing manner.

Figure 2:
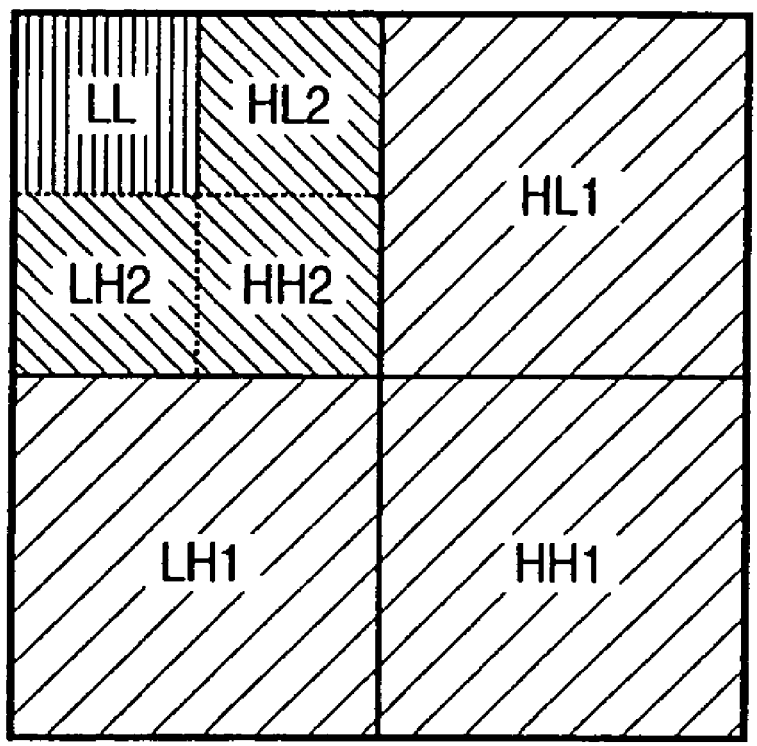
FIG. 2 is a view showing as an example a configuration of sub-bands of two levels of transformation coefficients obtained by two-dimensional discrete wavelet transformation.

A discrete wavelet transformation unit 3 performs two-dimensional discrete wavelet transformation on the inputted image data of each tile to divide the image data into frequency components, and outputs transformation coefficients (hereinafter referred to as sub-bands) that belong to respective plural frequency bands. FIG. 2 shows a configuration of sub-bands obtained by recursively performing two levels (twice) of two-dimensional wavelet transformation on a low-frequency band by the discrete wavelet transformation unit 3. Note that in a case of performing irreversible encoding, the discrete wavelet transformation unit 3 employs a real number filter in which the coefficients obtained after the wavelet transformation are real numbers, and in a case of performing reversible encoding, the wavelet transformation unit 3 employs an integer number filter in which the coefficients obtained after the wavelet transformation are integers.

FIG. 2 is briefly described. When the first time of wavelet transformation is performed, coefficients of the four sub-bands LL1, HL1, LH1 and HH1 are obtained. Among them, the similar wavelet transformation is performed on the lowest frequency component LL1, and coefficients of the sub-bands LL, HL2, LH2 and HH2 shown in FIG. 2 are obtained. Since there is always one LL component generated in wavelet transformation, most cases no suffix numeral is used in the customary practice. Note that wavelet transformation may be further performed on the LL component shown in FIG. 2. There is no limit to the number of times of wavelet transformation.

A quantization unit 4 performs quantization in units of the inputted sub-band using a quantization step set by a predetermined method, and generates a quantization index. Note that in a case of performing the aforementioned reversible encoding, the quantization unit 4 does not perform quantization, but outputs the inputted transformation coefficients.

Figure 3:
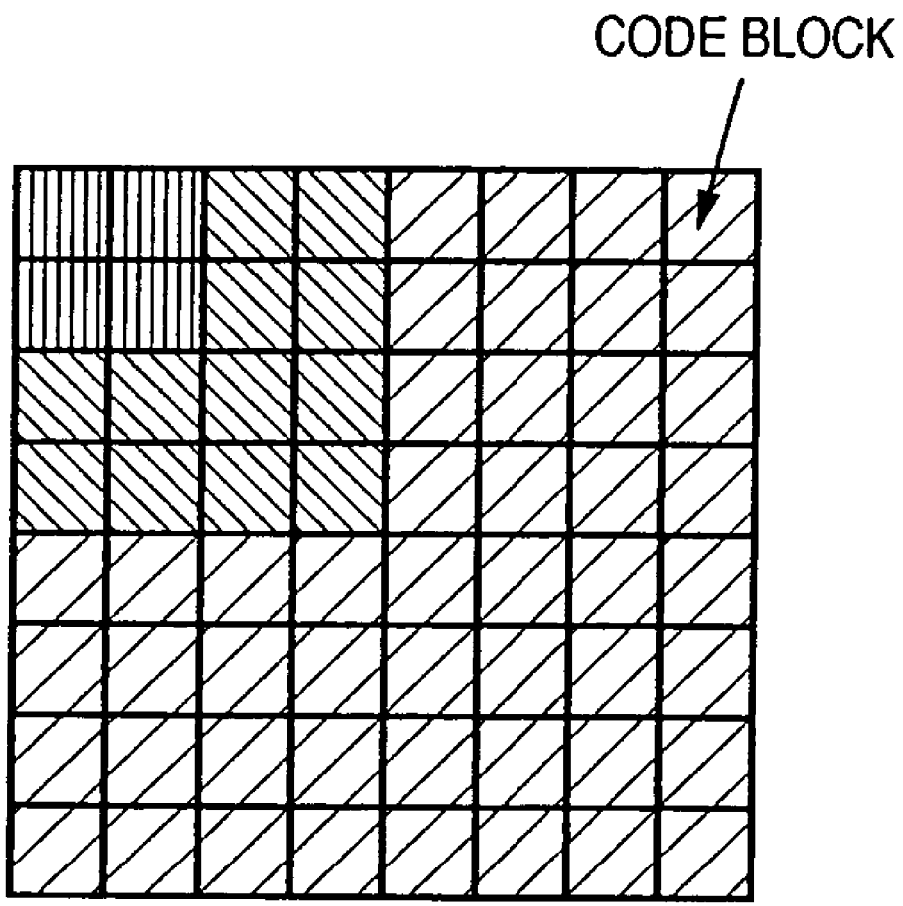
FIG. 3 is a view showing code blocks of the sub-band.

An entropy encoding unit 5 further divides the inputted sub-band into a plurality of rectangular blocks (hereinafter referred to as code blocks) as shown in FIG. 3 (division will not be performed if the sub-band has the same size as the rectangular block). The entropy encoding unit 5 performs entropy encoding in each of the code blocks and generates encoded data. In this stage, bit data representing a quantization index is arithmetically encoded in order of upper bit planes, and encoded data is generated.

Figure 4:
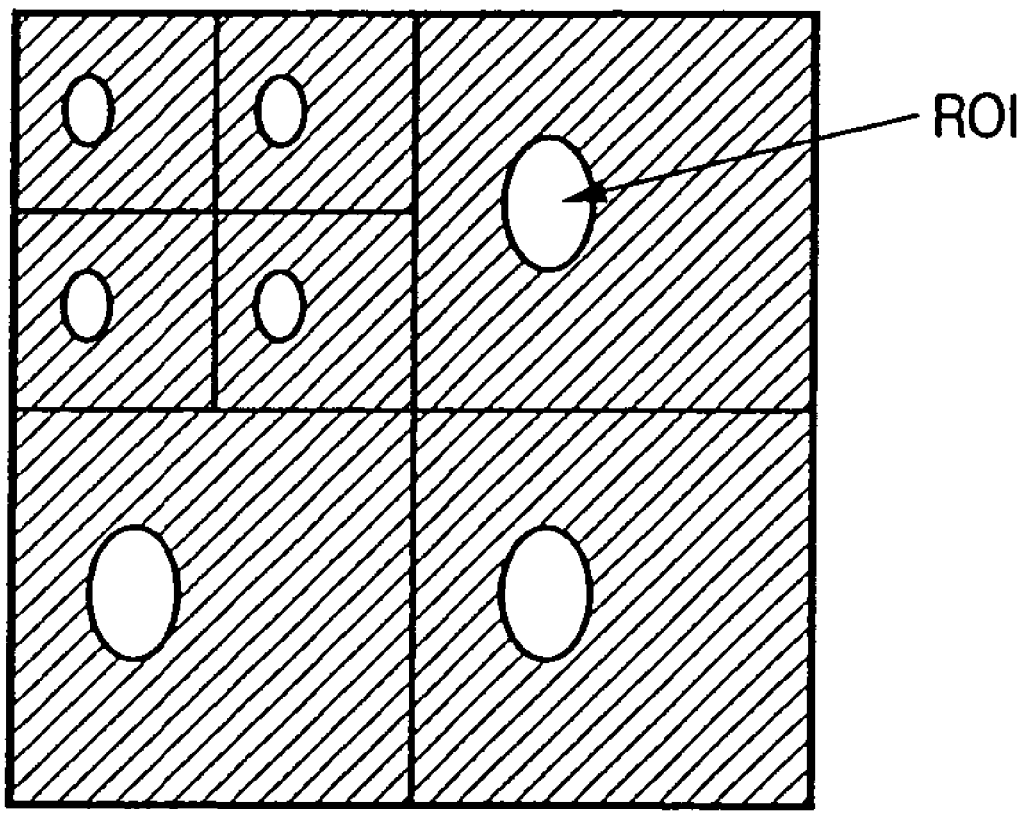
FIG. 4 is a view for explaining generation of ROI mask data.

This embodiment provides region setting means for setting a desired region of interest (ROI) at the time of image compression. By virtue of this means, the set ROI can be encoded while suppressing image deterioration. With respect to the ROI set by the region setting means, mask data is generated to specify a transformation coefficient corresponding to the ROI shown in FIG. 4 (surrounded inner region) in each of the sub-bands shown in FIG. 2. The coefficient included in the ROI in FIG. 4 is shifted up to a higher direction by a predetermined number of bits before encoding so that the coefficient of the ROI is completely separated on the bit plane from coefficients of regions other than the ROI. Therefore, by referring to the bits 1 and 0 in all the planes, it is possible to determine which region is the ROI. Note that the number of shift-up bits is added as a parameter to a predetermined marker of a code stream, which will be described later.

A code stream forming unit 6 forms a code stream based on a progressive scheme set by a predetermined method, and outputs the formed code stream. In the code stream forming, in accordance with the progressive scheme adopted, the code stream forming unit 6 selects an appropriate amount of encoded data in order of upper bit plane of the encoded data of each code block and constructs one or more layers.

Figure 5:
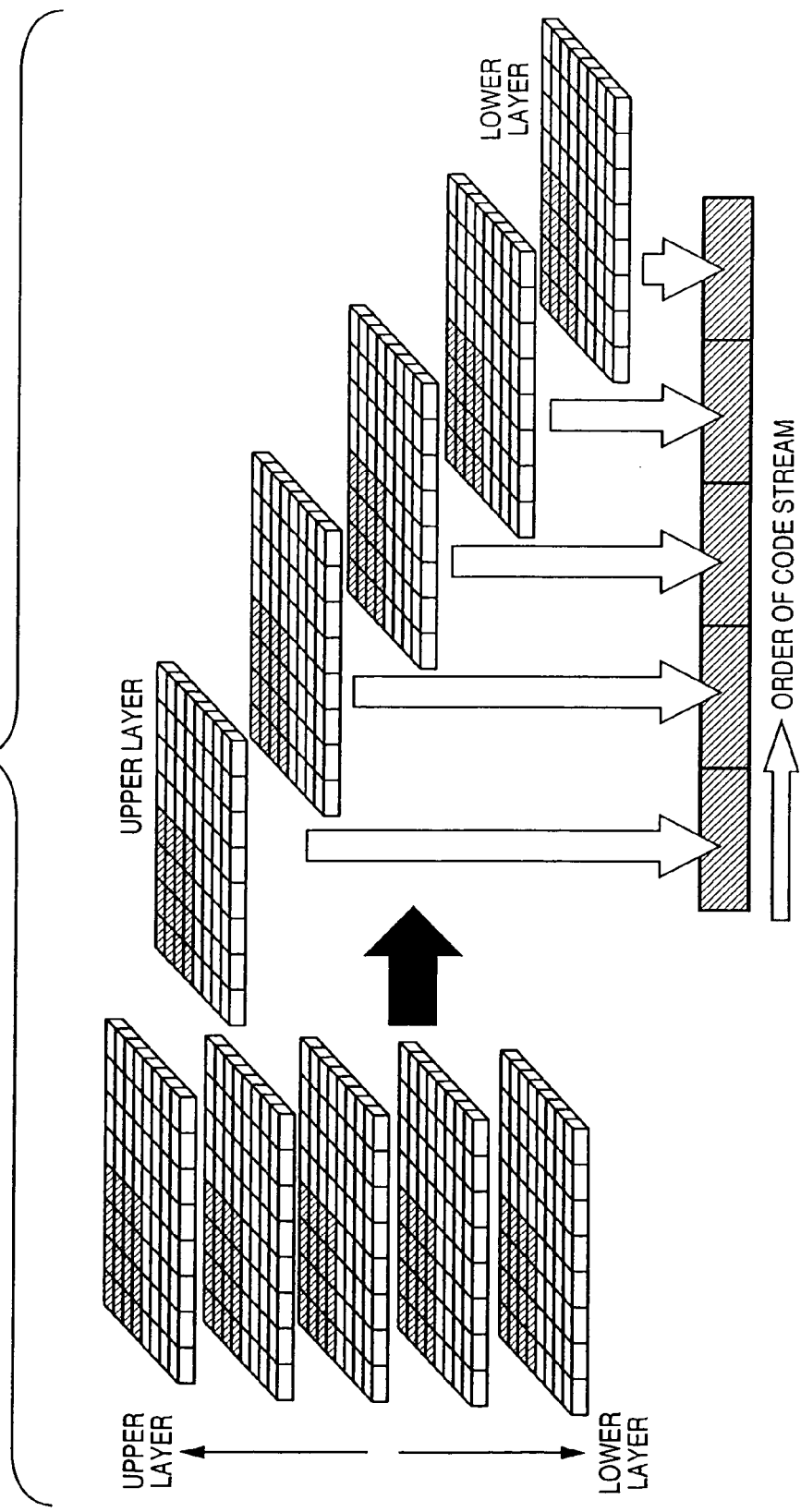
FIG. 5 is an explanatory view of an SNR scalable.

For instance, in a case where the set progressive scheme is an SNR scalable, the code stream forming unit 6 arranges the encoded data in units of layer in order from the upper layer (upper bit plane) to the lower layer (lower bit plane) as shown in FIG. 5. Note that the upper bit is dominant for expressing data, thus is important. Therefore, by omitting (ignoring) the latter data (lower layer) to exclude the encoded data in the lower bit plane from the arrangement of the encoded data, the ROI can be encoded with high image quality. In other words, with respect to the regions other than the ROI, since the lower bit plane is deleted, the amount of data can be reduced although the image quality is inferior to the ROI. In the present embodiment, when the ROI is set and image sensing is performed, the image data is compressed in the above-described process and stored. By virtue of the above-described process, the amount of code stream data can be optimized, and the quality of an image reproduced by decoding the code stream can be changed in accordance with the amount of data.

Figure 6:
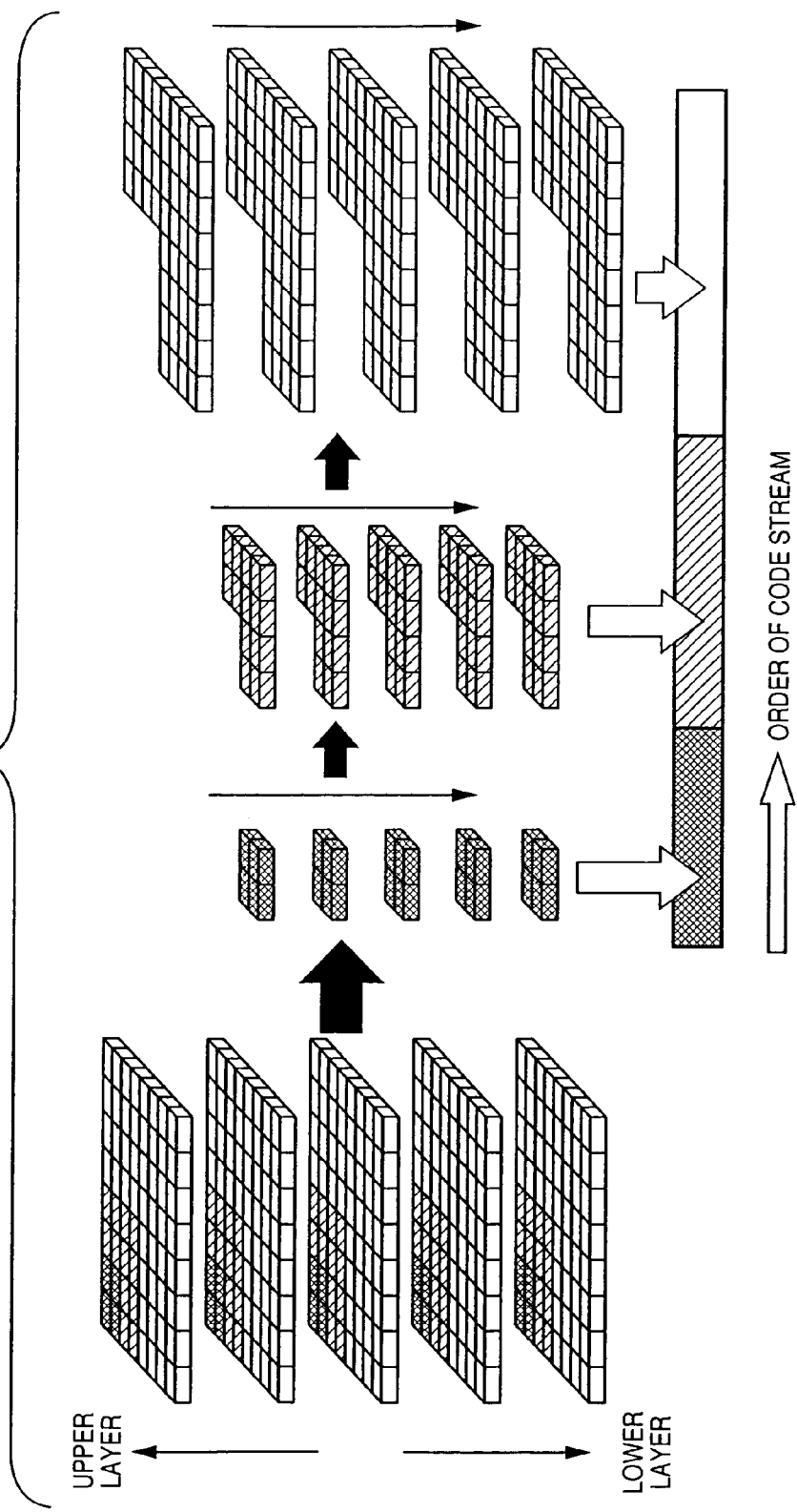
FIG. 6 is an explanatory view of a spatial resolution scalable.

Meanwhile, in a case where the set progressive scheme is a spatial resolution scalable, the code stream forming unit 6 arranges the encoded data in order from the low-frequency sub-band to the high-frequency sub-band as shown in FIG. 6. In this stage, it is also possible to select the code stream so as to exclude the encoded data of the latter sub-bands. By virtue of this process, the amount of code stream data can be optimized, and the resolution of an image reproduced by decoding the code stream can be changed in accordance with the amount of data.

Figure 7:
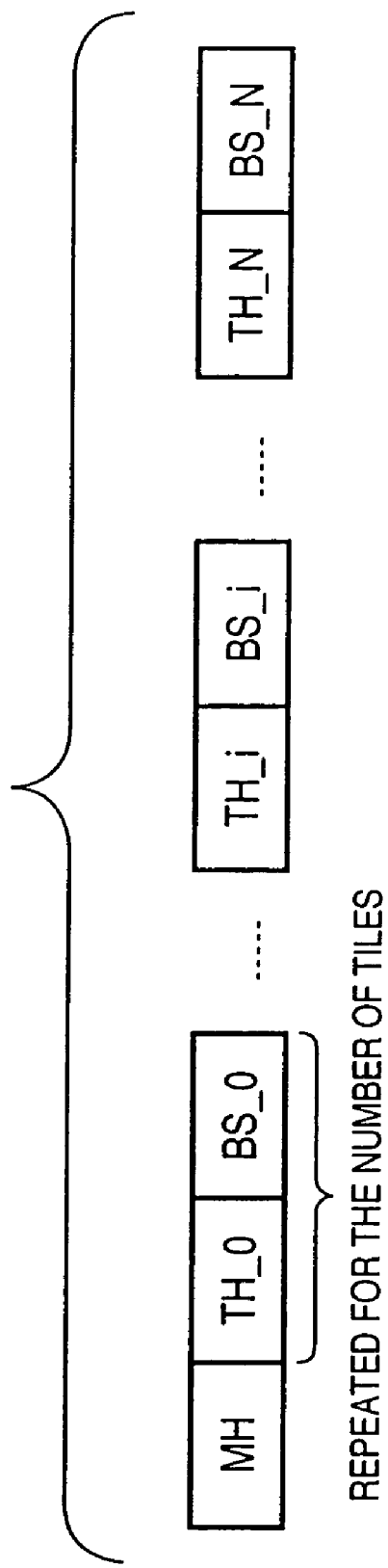
FIG. 7 is a view showing a construction of an encoded data stream after encoding.

Furthermore, the code stream forming unit 6 outputs a final code stream, which is configured with the code stream formed in accordance with each progressive scheme set as described above and a header configured with various markers. FIG. 7 shows a construction of the final code stream.

Referring to FIG. 7, the main header MH includes resolution of an image subjected to compression encoding, the number of color components, bit precision of each component (number of bits expressing each component), the size of the tile constituting the image, the type of filter of discrete wavelet transformation, and a marker which designates a parameter regarding the compression encoding such as a quantization step or the like as well as information regarding a code stream construction such as a progressive scheme or the like.

The tile header TH_i (i=0, 1, 2, . . . ) includes a marker indicating the beginning of the tile (i-th). In a case where a parameter regarding encoding of the tile of interest is changed from a parameter of a previously encoded tile, a marker designating the parameter is also included. BS_i (i=0, 1, 2, . . . ) is encoded data of the i-th tile, which is arranged based on the aforementioned progressive scheme.

Figure 8:
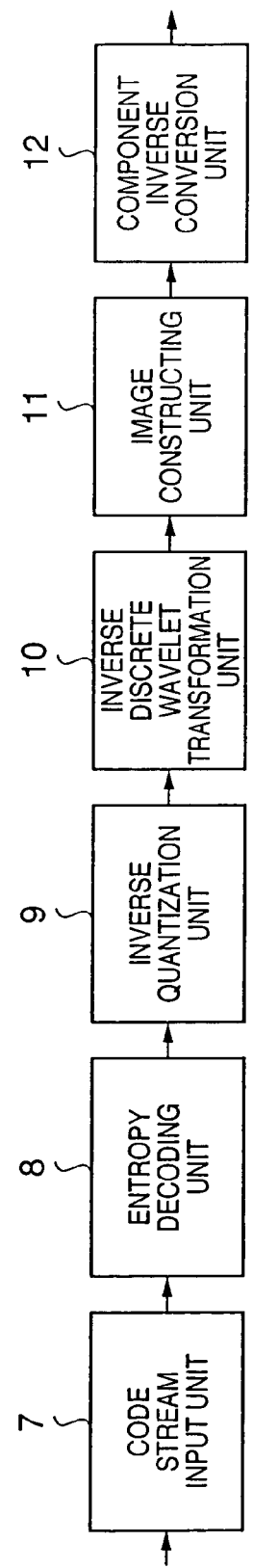
FIG. 8 is a block diagram showing an overall construction of a decoder according to an embodiment of the present invention.

FIG. 8 shows an overall construction of a decoder which decodes a code stream obtained by the above-described encoder.

A code stream input unit 7 inputs a code stream and extracts parameters, e.g., the size of the image and tile, a progressive scheme, a quantization step and so forth, which are necessary for the subsequent decoding processing. An actual code stream is outputted to the entropy decoding unit. In the overall code streams subjected to decoding, code streams for the number of plural tiles having the above-described form shown in FIG. 7 are included for the number of color components obtained by the aforementioned component conversion unit 1. In this embodiment, decoding processing is performed independently for each color component, and code streams of each tile constituting each color component subjected to decoding are sequentially decoded.

An entropy decoding unit 8 performs decoding on the inputted code stream and outputs a quantization index. In this decoding, the quantization index in the code block is decoded in order from the upper bit plane, and the quantization index is restored.

For instance, in a case where the progressive scheme of the code stream is an SNR scalable and only a predetermined number of upper layers is inputted, decoding is discontinued at the inputted layer, and the restored value at this time is outputted as a quantization index.

Herein, if there is a marker designating a ROI, the quantization index value of the upper bit plane corresponding to the shift-up number accompanied by the marker is shifted down for the number of shift-up bits and outputted. By this processing, the quantization index of the ROI is restored to an appropriate value.

An inverse quantization unit 9 performs inverse quantization on the inputted quantization index based on the quantization step previously read from the code stream, and restores the transformation coefficient to be outputted.

An inverse discrete wavelet transformation unit 10 performs two-dimensional inverse discrete wavelet transformation based on the inputted transformation coefficient, thereby restoring corresponding color component data to be outputted.

Note, in a case where the progressive scheme of the code stream is a spatial resolution scalable and only the sub-bands of the levels encoded in the first half (e.g., LL only, or LL, HL2, LH2, HH2) are restored, the resolution of the decoded color component data changes in accordance with the level of the decoded sub-band.

Figure 9:
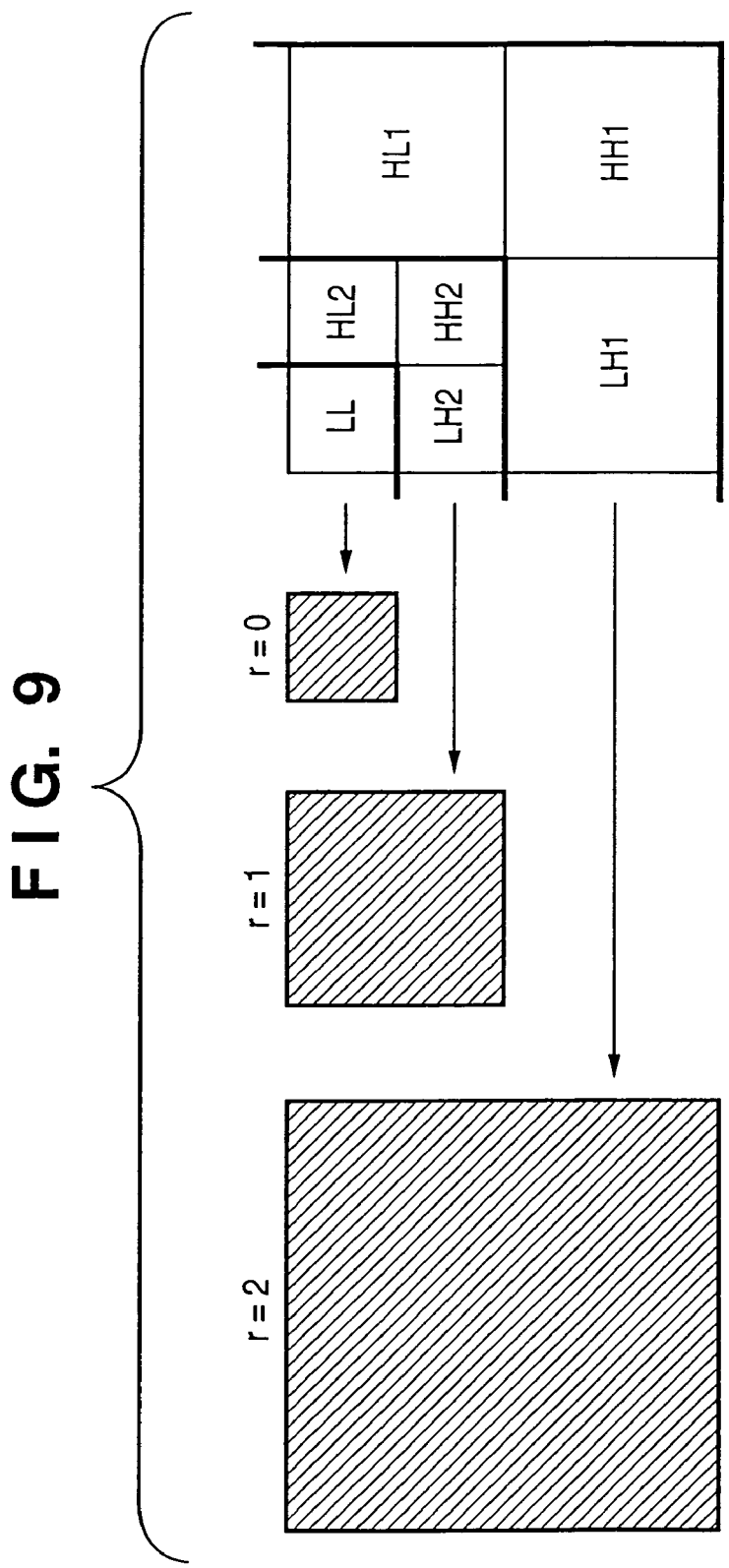
FIG. 9 is a view showing an image size that can be generated based on inverse discrete wavelet transformation data.

This is shown in FIG. 9. In a case where only the coefficient of the sub-band LL is decoded, inverse discrete wavelet transformation is actually not performed, but the coefficient of the sub-band LL is adjusted so as to fit in the original data range and the adjusted coefficient is outputted. In this case, the restored color component data has a quarter size of the original resolution in the horizontal and vertical directions, as shown in "r=0" in FIG. 9.

Furthermore, in a case of decoding the sub-bands LL, HL2, LH2 and HH2, performing one level of inverse transformation restores the color component data having a half size of the original resolution in the horizontal and vertical directions, as shown in "r=1" in FIG. 9.

The above-described processing is performed in units of tiles. An image constructing unit 11 takes the restored color component data of each tile to reconstruct color component data constituting the original image subjected to encoding, and outputs the data to a component inverse conversion unit 12.

The component inverse conversion unit 12 performs predetermined conversion on the inputted color component data to restore the image data having a color space of the original encoded image, and outputs the image data. If thinning processing has been performed on the original color component data by the component conversion unit 1, the color component data is converted (data interpolation) to necessary resolution before the inverse conversion is performed.

As described above, in a case where the progressive scheme is an SNR scalable, decoding layers are limited to control the image quality of the restored image. In a case where the progressive scheme is a spatial resolution scalable, the number of levels of sub-bands to be subjected to inverse discrete wavelet transformation is limited to control the resolution of the restored image.

<Configuration of Digital Camera>

Encoding and decoding according to the present embodiment have been described above. Next, a configuration of a digital camera adopted by the present embodiment is described.

Figure 10A:
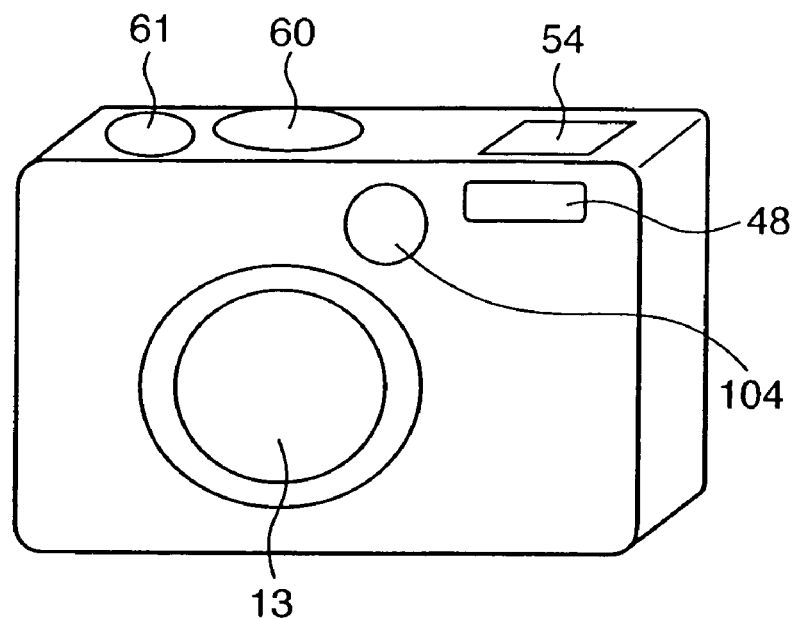
FIGS. 10A and 10B are views showing an external appearance of a digital camera according to an embodiment of the present invention.
Figure 10B:
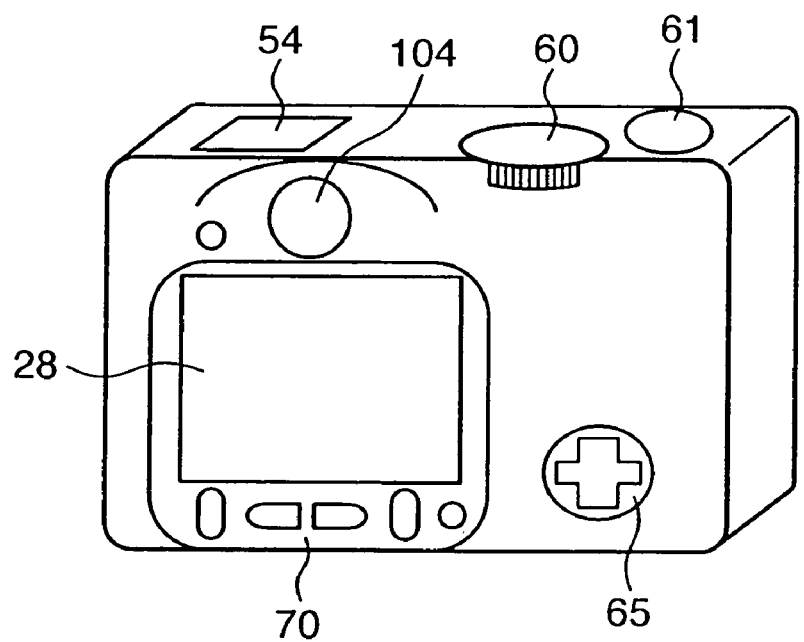
Figure 11:
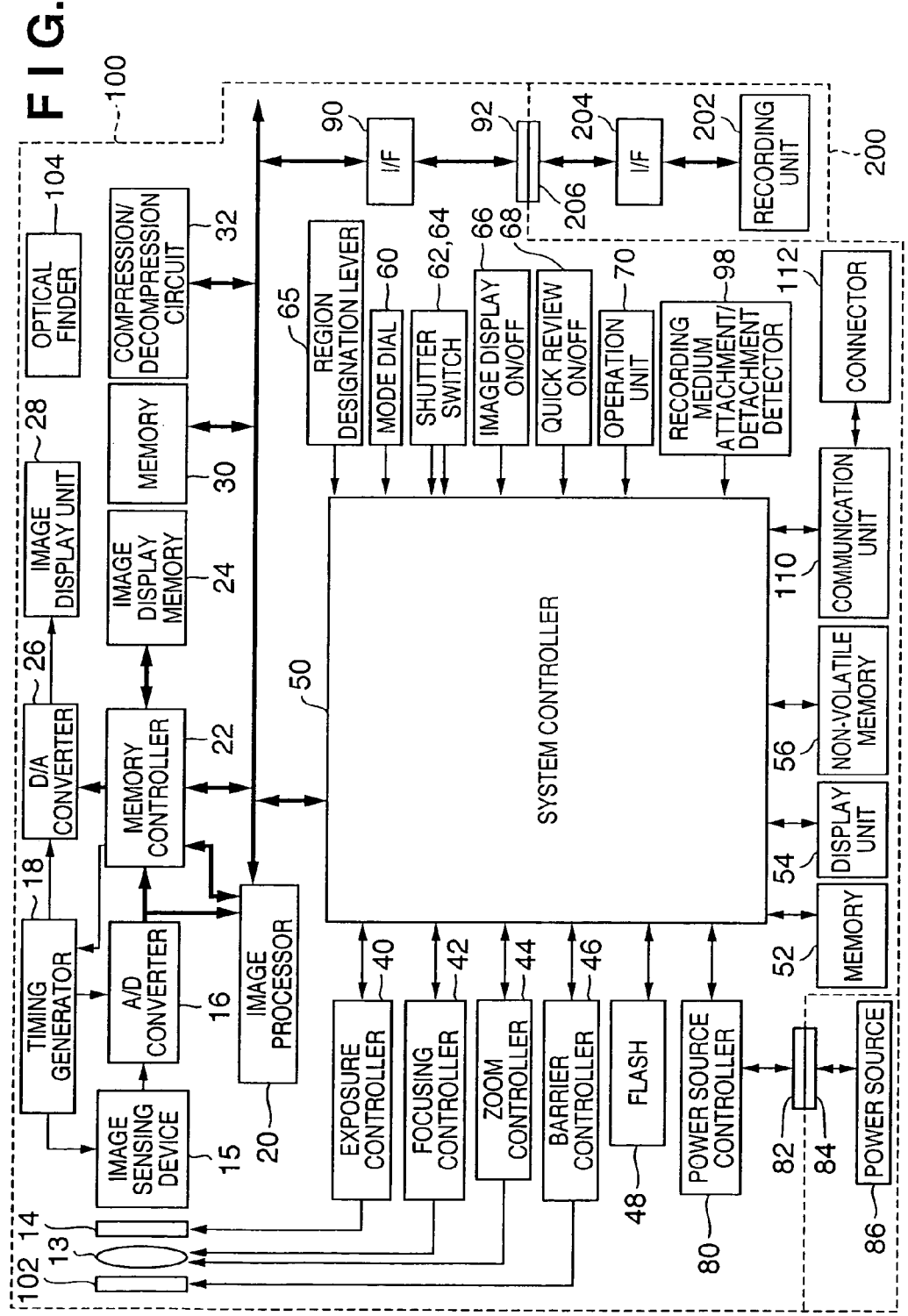
FIG. 11 is a block diagram showing a configuration of a digital camera according to an embodiment of the present invention.

FIGS. 10A and 10B are respectively a front view and a rear view of the digital camera according to the present embodiment. FIG. 11 is a block diagram showing a configuration of the digital camera according to this embodiment.

Hereinafter, the construction of the digital camera according to this embodiment is described with reference to these drawings.

In FIG. 11, numeral 13 denotes an image sensing lens; 14, a shutter having a diaphragm function; 15, an image sensing device which converts an optical image to an electric signal; and 16, an A/D converter which converts an analog signal of the image sensing device 14 to a digital signal. Numeral 18 denotes a timing generator which supplies the image sensing device 15, A/D converter 16, and D/A converter 26 with a clock signal and a control signal, and which is controlled by a memory controller 22 and a system controller 50.

Numeral 20 denotes an image processor which performs predetermined pixel interpolation and color conversion processing on data from the A/D converter 16 or data from the memory controller 22. Further, the image processor 20 performs predetermined calculation processing using sensed image data, and based on the calculation result the system controller 50 performs through-the-lens (TTL) auto-focus (AF) processing, auto-exposure (AE) processing, and pre-flash (EF) processing by controlling an exposure controller 40 and a focusing controller 42. Furthermore, the image processor 20 performs predetermined calculation processing using sensed image data, and performs TTL auto white balance (AWB) processing based on the calculation result.

Numeral 22 denotes a memory controller which controls the A/D converter 16, timing generator 18, image processor 20, image display memory 24, D/A converter 26, memory 30, and compression/decompression circuit 32. Data from the A/D converter 16 is written in the image display memory 24 or memory 30 through the image processor 20 and memory controller 22 or directly through the memory controller 22.

Numeral 24 denotes an image display memory; 26, a D/A converter; and 28, an image display unit configured with a TFT, an LCD or the like. Image data to be displayed, which is written in the image display memory 24, is displayed by the image display unit 28 through the D/A converter 26. Further, the image display unit 28 is capable of turning ON or OFF the displaying in accordance with a designation from the system controller 50.

Numeral 30 denotes a memory (configured with RAM) for storing a still image or a motion image, and has a storage capacity sufficient for storing a predetermined number of still images or a predetermined time of motion images.

By virtue of this memory, it is possible to write a large amount of images in the memory 30 at high speed even in a case of sequentially sensing plural numbers of still images or a case of panoramic image sensing. Moreover, the memory 30 can be used as a working area of the system controller 50. Numeral 32 denotes a compression/decompression circuit for performing compression or decompression on image data, which reads an image stored in the memory 30, performs compression or decompression on the read image data, and writes the processed data in the memory 30.

Numeral 40 denotes an exposure controller for controlling the shutter 14 having a diaphragm function. The exposure controller 40 also has a flash controlling function along with a flash 48. Numeral 42 denotes a focusing controller which controls focusing of the image sensing lens 13; 44, a zoom controller which controls zooming of the image sensing lens 13; and 46, a barrier controller which controls operation of a protection unit 102 serving as a barrier. Numeral 48 denotes a flash including an AF auxiliary light floodlighting function and a flash controlling function. The exposure controller 40 and focusing controller 42 are controlled by the TTL method. Based on the calculation result of the image processor 20 which performs calculation on sensed image data, the system controller 50 controls exposure controller 40 and focusing controller 42.

Numeral 50 denotes a system controller which controls the entire image processing apparatus 100; and 52, a memory which stores constants, variables, programs and so on for operation of the system controller 50.

Numeral 54 denotes a liquid crystal display device which displays an operation state, a message or the like, in accordance with execution of a program in the system controller 50. Indications displayed in the display unit 54 include: single-shot/continuous-shot indication, self-timer indication, compression ratio indication, number of recording pixels indication, number of recording pictures indication, number of recordable pictures indication, battery remaining amount indication, recording medium 200 attachment/detachment indication, communication I/F operation indication, date/time indication, and so on.

Numeral 56 denotes an erasable/recordable non-volatile memory, and, for instance, EEPROM or the like is employed.

Numerals 60, 61, 62, 64, 66, 68 and 70 denote an operation unit for inputting various operation designations to the system controller 50. The operation unit includes either alone or a combination of a switch, a dial, a touch panel, a pointing device using line of sight detection, a speech recognition device, and the like. More detailed descriptions of the operation unit are described below.

Numeral 60 denotes a mode dial switch used for switching off the power, setting various function modes such as an automatic image sensing mode, an image sensing mode, a panoramic image sensing mode, a playback mode, a multiple-screen playback/delete mode, a protection setting mode, a PC connection mode, and the like.

Numeral 62 denotes a shutter switch SW1 which is turned ON at the half stroke of a shutter button 61 for designating start of the auto-focus (AF) processing, auto-exposure (AE) processing, auto white balance (AWB) processing, pre-flash (EF) processing and the like.

Numeral 64 denotes a shutter switch SW2 which is turned ON at the full stroke of the shutter button (not shown) for designating start of a series of the following processes: an exposure process in which image data signals read out of the image sensing device 15 is written in the memory 30 through the A/D converter 16 and memory controller 22; a developing process using calculation by the image processor 20 and memory controller 22; and a recording process in which image data read out of the memory 30 is subjected to compression by the compression/decompression circuit 32 and the compressed image data is written in the recording medium 200.

Numeral 65 denotes a region designation lever for designating an arbitrary region, which is used for designating a high-image-quality region which will be described later. Numeral 66 denotes an image display ON/OFF switch for turning ON/OFF the image display unit 28. Numeral 68 denotes a quick review ON/OFF switch for setting a quick review function, which automatically playbacks the sensed image data immediately after image sensing.

Numeral 70 denotes an operation unit having various buttons, a touch panel (provided on the front surface of the display screen) and the like. The operation unit includes a menu button, a set button, a macro button, a multiple-screen playback new-page button, a flash button, a single-shot/continuous-shot/self-timer switch button, a menu + (plus) shift button, a menu − (minus) shift button, a playback image forward + (plus) button, a playback image backward − (minus) button, an image sensing quality selection button, an exposure correction button, a date/time setting button, and so on. On the touch panel, logical buttons corresponding to the situation are displayed, and the position of the button is touched by the user.

Numeral 80 denotes a power source controller comprising a battery detector, a DC-DC converter, a switch for switching a block to be electrified, and the like. The power source controller 80 detects existence/absence of a battery, type of battery, and a remaining amount of battery, controls the DC-DC converter based on the detection result and a designation from the system controller 50, and supplies a necessary voltage to respective units including the recording medium for a necessary period of time. Numerals 82 and 84 denote a connector. Numeral 86 denotes a power source unit comprising a primary battery such as an alkaline battery, a lithium battery or the like, a second battery such as a NiCd battery, a NiMH battery, a Li battery or the like, and an AC adapter.

Numeral 90 denotes an interface with a recording medium such as a memory card, a hard disk or the like; 92, a connector for realizing connection with the recording medium such as the memory card or hard disk or the like; and 98, a recording medium attachment/detachment detector for detecting by the connector 92 whether or not the recording medium 200 is attached.

Numeral 102 denotes a protection unit which is a barrier for protecting the image sensing unit from stain and damage by covering the image sensing unit including the lens 10 of the image processing apparatus 100. Numeral 104 denotes an optical finder which enables image sensing without using an electronic finder function of the image display unit 28. In the optical finder 104, a part of the functions of the display unit 54, e.g., focus indication, camera shake warning indication, flash charge indication, shutter speed indication, f number indication, exposure correction indication and the like, are provided.

Numeral 110 denotes a communication unit having various communication functions, e.g., RS232C or USB, IEEE1394, P1284, SCSI, a modem, LAN, wireless communication or the like. Numeral 112 denotes a connector for connecting the image processing apparatus 100 with another device through the communication unit 110, or through an antenna in case of wireless communication.

Numeral 200 denotes a recording medium such as a memory card, a hard disk or the like. The recording medium 200 includes a recording unit 202 configured with a semiconductor memory, a magnetic disk or the like, an interface 204 between the image processing apparatus 100 and the recording medium 200, and a connector 206 for connecting the recording medium 200 with the image processing apparatus 100.

Next, a method of designating a high image quality region (ROI) is described with reference to FIGS. 12A, 12B, and 13A to 13C.

Normally, a digital camera displays in real time a simplified image of the image the camera lens is directed to in the image display unit 28, and a high-precision image is recorded when the shutter button (or a release button) is operated. The following ROI setting is performed while a real-time image is displayed in the image display unit 28 before the shutter button is operated.

Figure 12A:
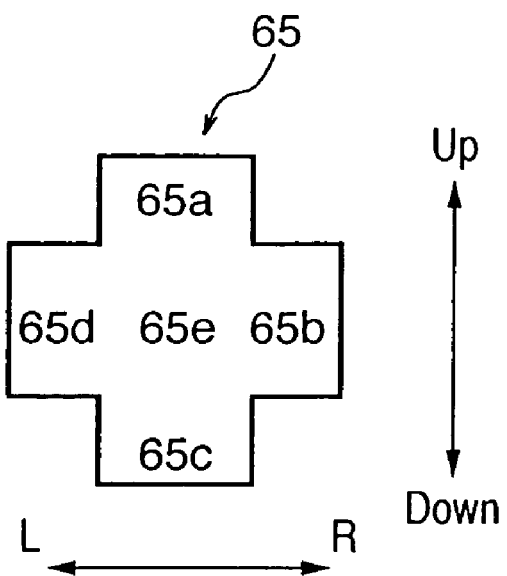
FIGS. 12A and 12B are views showing a region designation lever according to an embodiment of the present invention.
Figure 12B:
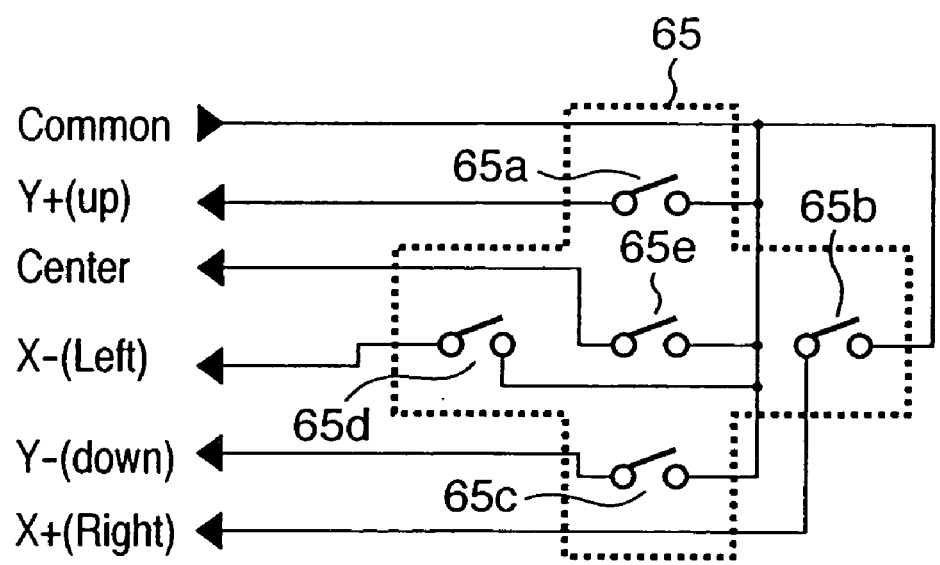

FIG. 12A shows a detailed view of the region designation lever 65, and 12B shows a detailed view of a detection circuit of the region designation lever 65. FIGS. 13A to 13C show examples of images displayed on the image display unit (monitor) 28. Referring to FIG. 12A, numeral 65a denotes an upper designation lever for designating the cursor to move in the upward direction; 65b, a right designation lever for designating the cursor to move in the right direction; 65c, a lower designation lever for designating the cursor to move in the downward direction; 65d, a left designation lever for designating the cursor to move in the left direction; and 65e, a set button for confirming the cursor position. Referring to FIG. 12B, Y+ denotes an upper detection switch which receives a designation of the upper designation lever 65a and sends an upper-direction cursor movement command to the system controller 50; X+, a right detection switch which receives a designation of the right designation lever 65b and sends a right-direction cursor movement command to the system controller 50; Y−, a lower detection switch which receives a designation of the lower designation lever 65c and sends a lower-direction cursor movement command to the system controller 50; X−, a left detection switch which receives a designation of the left designation lever 65d and sends a left-direction cursor movement command to the system controller 50; and C, a selection switch which receives a designation of the set button 65e and sends a cursor confirmation command to the system controller 50. A region can be designated by operating the respective levers 65a, 65b, 65c, and 65d of the region designation lever 65 as well as the set button 65e.

Next, a method of actually designation the ROI is explained. First, when a user depresses the set button 65e in the center of the region designation lever 65 to designate the ROI, the cursor P0 specifying the region is multidisplayed in the center position of the image display unit 28 (FIG. 13A). The user operates the region designation lever 65 in the desired direction to move the cursor P0 while viewing the cursor P0 displayed on the image display unit 28. The system controller 22 detects the depression state of the region designation lever 65, calculates the cursor movement amount based on the detection result, and moves the cursor P0 to the calculated position. When the user depresses the set button 65e of the region designation lever 65, a point of the frame that forms the ROI is confirmed. To similarly designate the next point, the region designation lever is operated to move the cursor. This operation is repeated until four points are selected (FIG. 13B). Then, when the set button 65e is depressed, the region formed by the points P1, P2, P3, and P4 is designated as the ROI (FIG. 13C).

Note that the color and luminance of the frame of the designated region are adjusted so that the frame can be differentiated from other regions at a glance. Herein although the ROI is designated by selecting four points, other arbitrary figures, e.g., a circle, a polygon or the like, may be used.

Assuming that the shape of the ROI is a rectangle configured with sides horizontal to and perpendicular to the display unit 28, only two points P1 and P3 in FIG. 13B may be designated to set a rectangle having the points P1 and P3 as a diagonal line. This way, the region designation operation becomes simple and easy. Furthermore, when the point P1 is set, the point P3 which is symmetrical about point P1 may be displayed so that only setting the point P1 can designate a rectangle (the case where the ROI is near the center of the display unit).

A specific object or person can be designated using an edge component and a color component by an image processing and image recognition unit. This can also be designated by using motion data.

Furthermore, the touch panel may be used for designating the ROI. When the touch panel is used, the touched position is first provided as the center position of the ROI, and a circle or a rectangle having the provided center position is determined. This allows easy and intuitive setting of the ROI (in case of a rectangle, a predetermined aspect ratio is provided or an operation for changing the predetermined aspect ratio is necessary).

Upon setting the ROI in the above-described manner, when the user operates the shutter button, the ROI of the sensing image is stored in the recording medium 200 with higher image quality than other regions of the image. Therefore, the amount of encoded data can be made smaller than the case of encoding the entire image with high quality; thus it is possible to store a larger amount of sensed images in the recording medium 200.

Note that the above description gives an example on setting the ROI before the shutter button is operated. However, an image that has already been sensed and stored in the recording medium 200 may be displayed on the image display unit 28 to set the ROI, and the ROI-set image may be stored again. In this case, although the image quality of the regions other than the set ROI declines, the amount of data for the entire image is reduced. Therefore, it is possible to increase an available area in the storage.

Figure 14:
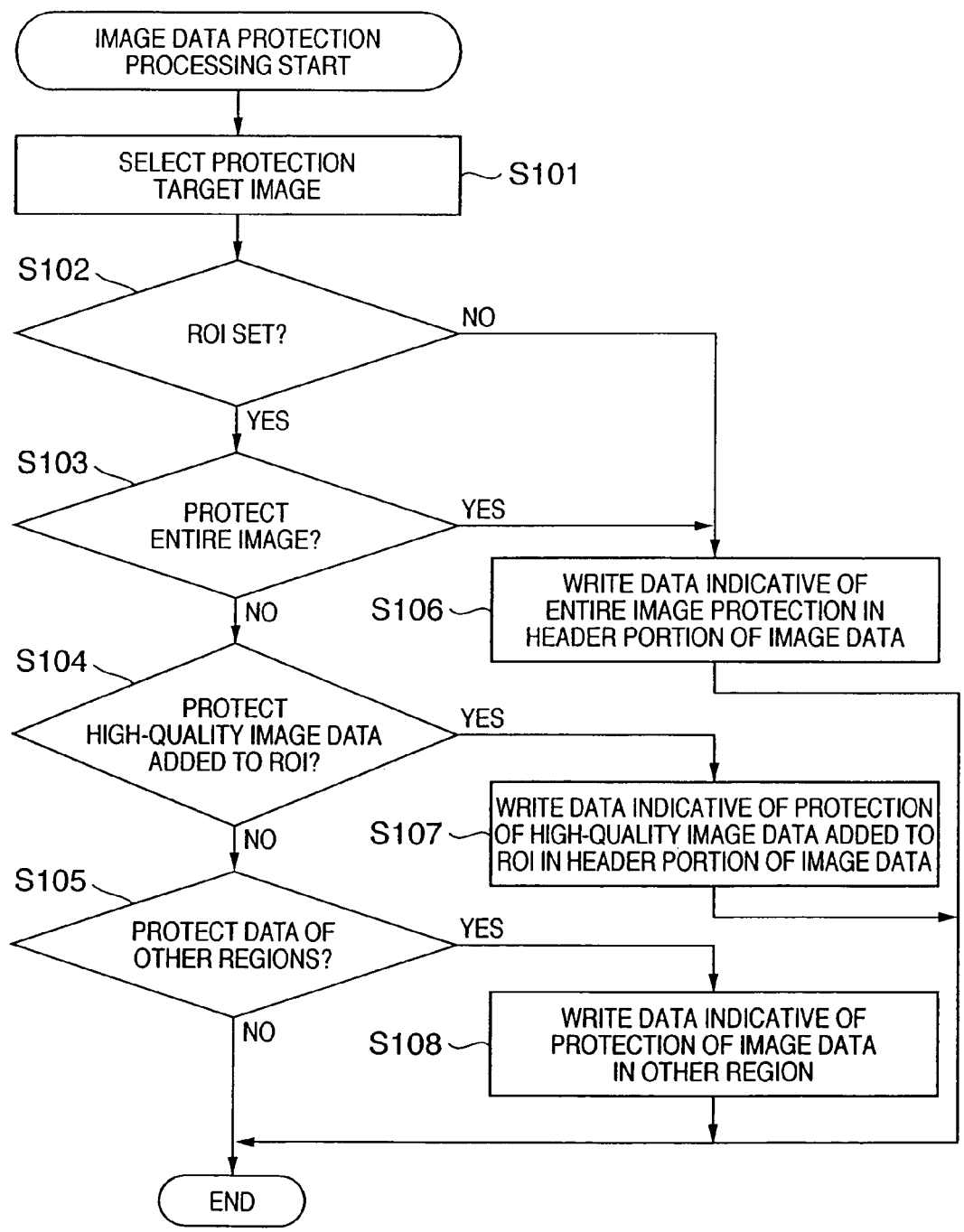
FIG. 14 is a flowchart describing an image data protection procedure of a digital camera according to an embodiment of the present invention.

Next, an image data protection procedure of a digital camera, which is the feature of the present embodiment, is described with reference to FIG. 14. FIG. 14 is a flowchart describing the image data protection procedure of the digital camera according to the present embodiment. To perform image data protection, a user performs a predetermined operation, i.e., switching to a protection setting mode using the mode dial switch 60.

Figure 15:
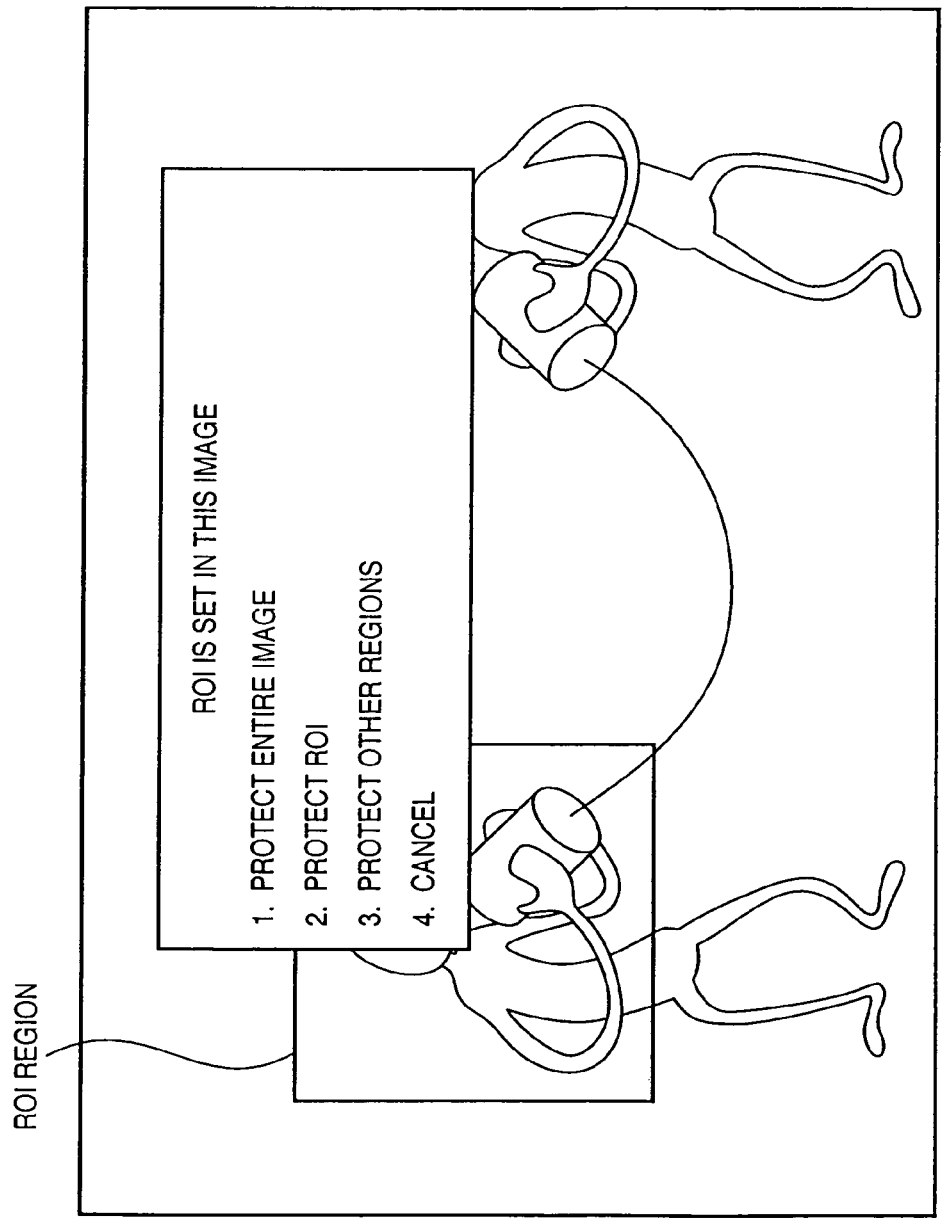
FIG. 15 is an explanatory view of an image data protection region designation method according to an embodiment of the present invention.

In step S101, an image subjected to protection setting is selected from images recorded in the recording medium 200 using the operation unit such as 65, 70, or the like, while viewing the image display unit 28. In step S102, it is determined whether or not a ROI has been set. If the ROI is not set, the control proceeds to step S106 where data indicative of entire image protection is written in the header portion of the image data, and the control ends. If it is determined in step S102 that the ROI is set, a menu shown in FIG. 15 is displayed to prompt the user to make a selection. If the user selects entire image protection (YES in step S103), the control proceeds to step S106 where data indicative of entire image protection is written in tie header portion of the image data, and the control ends. If the user selects protection of the high-quality image data added to the ROI in FIG. 15 (YES in step S104), the control proceeds to step S107 where data indicative of protection of the high-quality image data added to the ROI is written in the header portion of the image data, and the control ends. If the user selects protection of other regions (non-ROI region) in FIG. 15 (YES in step S105), the control proceeds to step S108 where data indicative of protection of the image data in the non-ROI region is written in the header portion of the image data, and the control ends.

Note although data indicative of image data protection is written in the header portion of image data in the present embodiment, since the characteristic of the present embodiment is not to protect image data in units of image, but to protect image data in units of region set in each image, this embodiment does not limit the location where the image data protection data is written.

Figure 16:
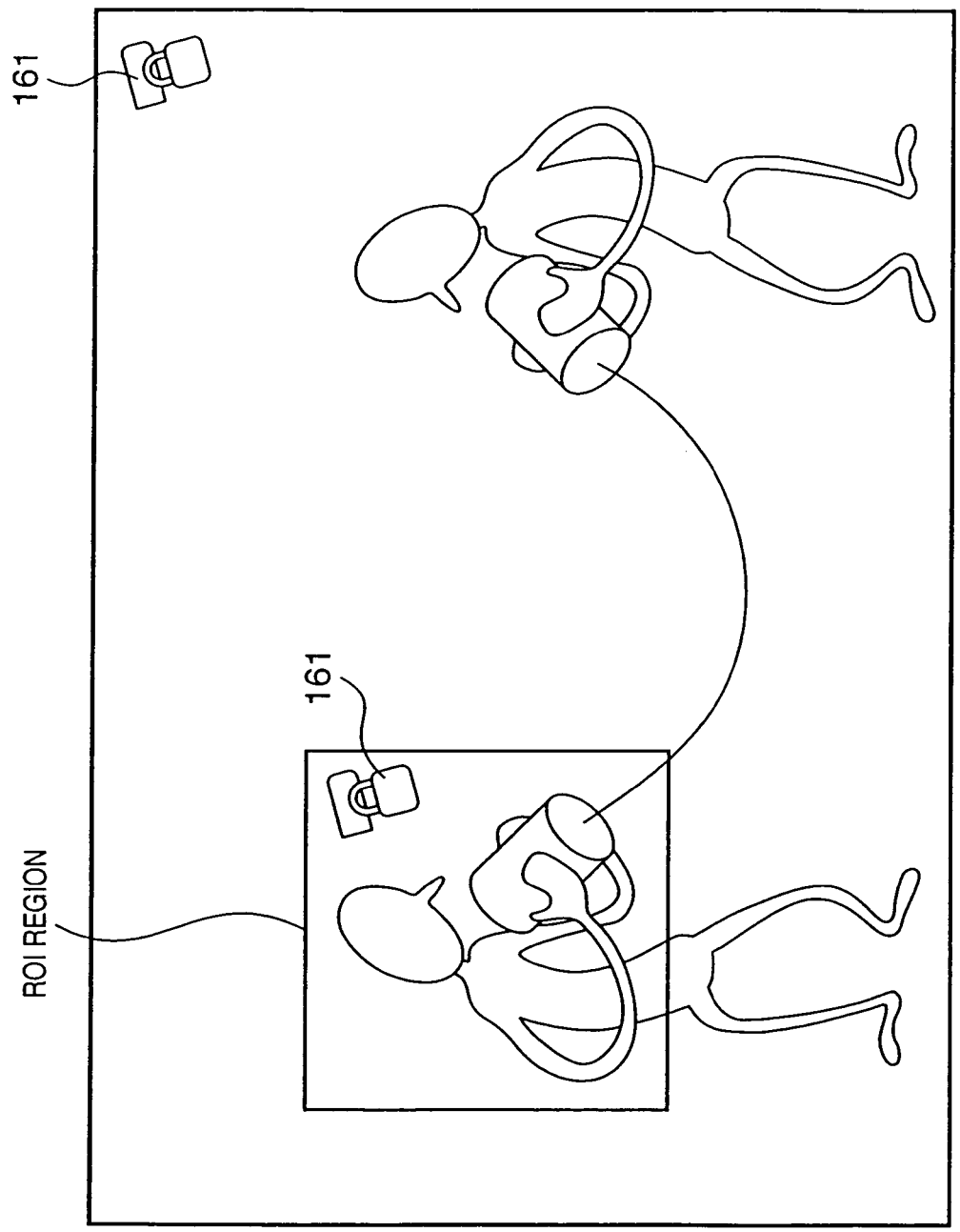
FIG. 16 is an explanatory view of an image display example where image data is protected according to an embodiment of the present invention.

Moreover, in a case where a data-protected image is displayed on the image display unit 28, a mark 161 shown in FIG. 16 may be displayed to indicate that the image data is protected. The example in FIG. 16 shows that the ROI and other regions are both protected, in other words, the entire image is protected.

Next, an image data deleting procedure of a digital camera, which is the feature of the present embodiment, is described with reference to FIG. 17. FIG. 17 is a flowchart describing the image data deleting procedure of the digital camera according to the present embodiment. To perform image data deletion, a user performs a predetermined operation, i.e., switching to a deletion mode using the mode dial switch 60.

In step S201, an image subjected to deletion is searched using the operation unit such as 65, 70, or the like, while viewing the image display unit 28. When the image subjected to deletion is displayed and selected, the control proceeds to step S202.

In step S202, it is determined whether or not protection processing has been performed on the selected image by checking data in the header portion of the image data.

Figure 18:
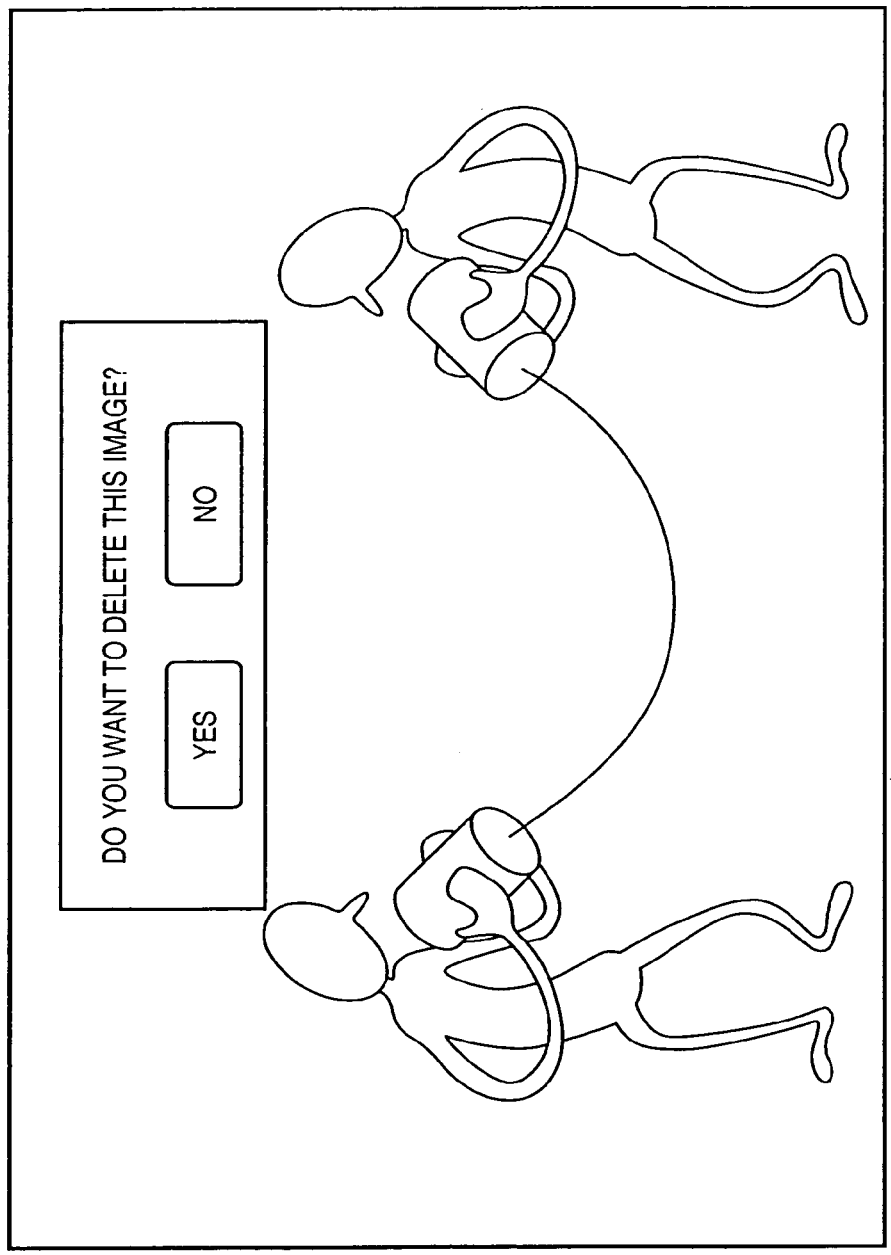
FIG. 18 is a view showing a display example at the time of deleting the entire image data according to an embodiment of the present invention.

If it is determined that protection has not been performed, the control proceeds to step S203 where it is determined whether or not a ROI has been set. If it is determined that the ROI is not set, the control proceeds to step S204 where the entire image is deleted from the storage medium 200. Note that a message prompting a user to confirm image data deletion may be displayed as shown in FIG. 18. If cancellation is selected, the control escapes from the deletion control (ends without deleting image data).

Figure 19:
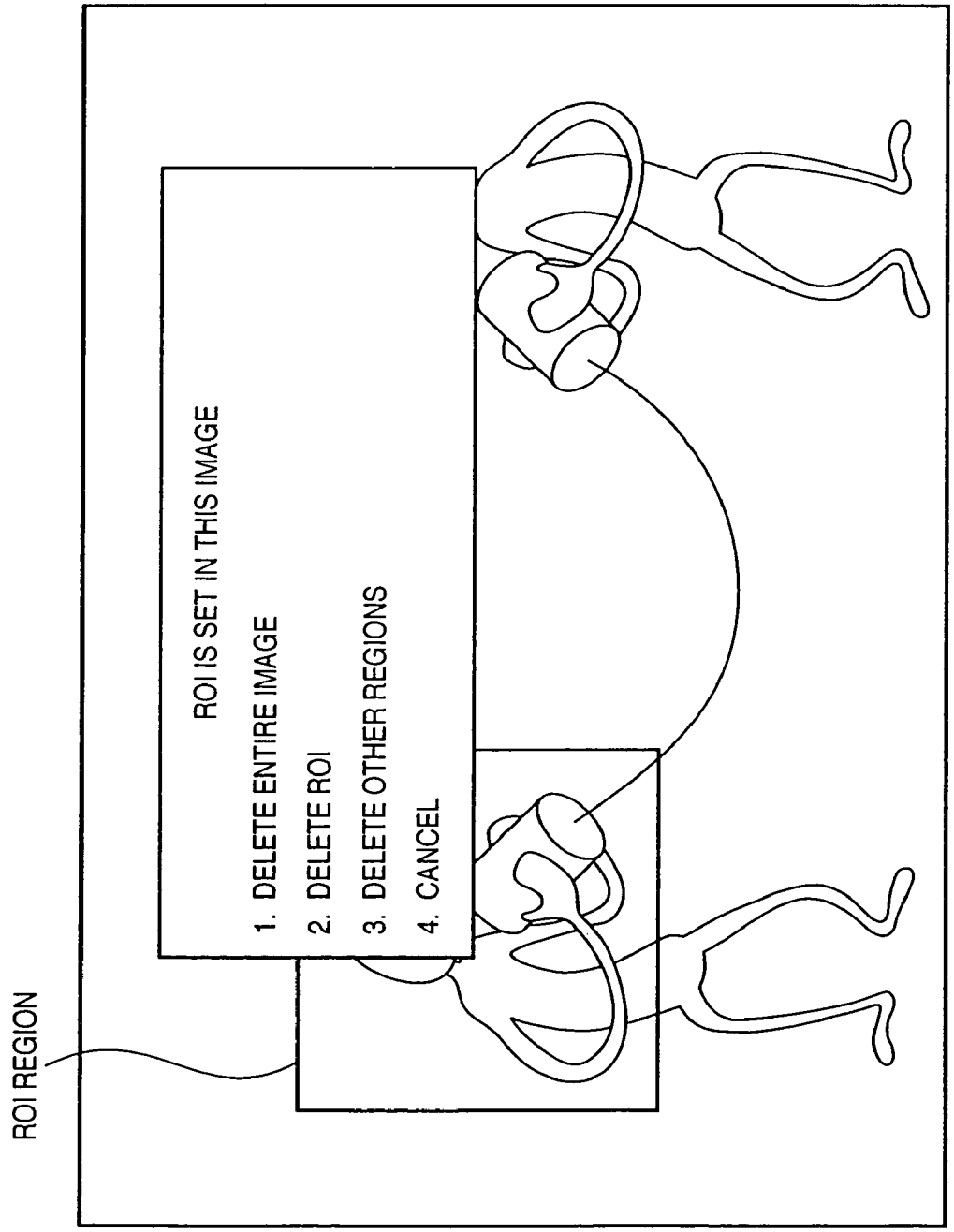
FIG. 19 is a view showing a display example at the time of designating an image data deleting region according to an embodiment of the present invention.

If it is determined in step S203 that the ROI is set, the control proceeds to step S205 where a user is asked to make a selection from deleting the entire image, deleting the ROI, deleting other regions (non-ROI region), or cancellation as shown in FIG. 19. To clearly specify the ROI, the frame indicative of the set ROI is displayed as shown in FIG. 19. If cancellation is selected, the control ends. If a deletion target is selected, the control proceeds to step S206 where the data of the designated region is deleted from the image data. Herein, if the user designates to keep the ROI (delete non-ROI region), planes are deleted from the lowest level of the planes for the number of shifted up bits of the ROI. On the contrary, if the user designates to keep the non-ROI region (delete the ROI), planes are deleted from the highest level of the planes for the number of shifted up bits of the ROI, so that data in the lower level plane only is kept.

Figure 20:
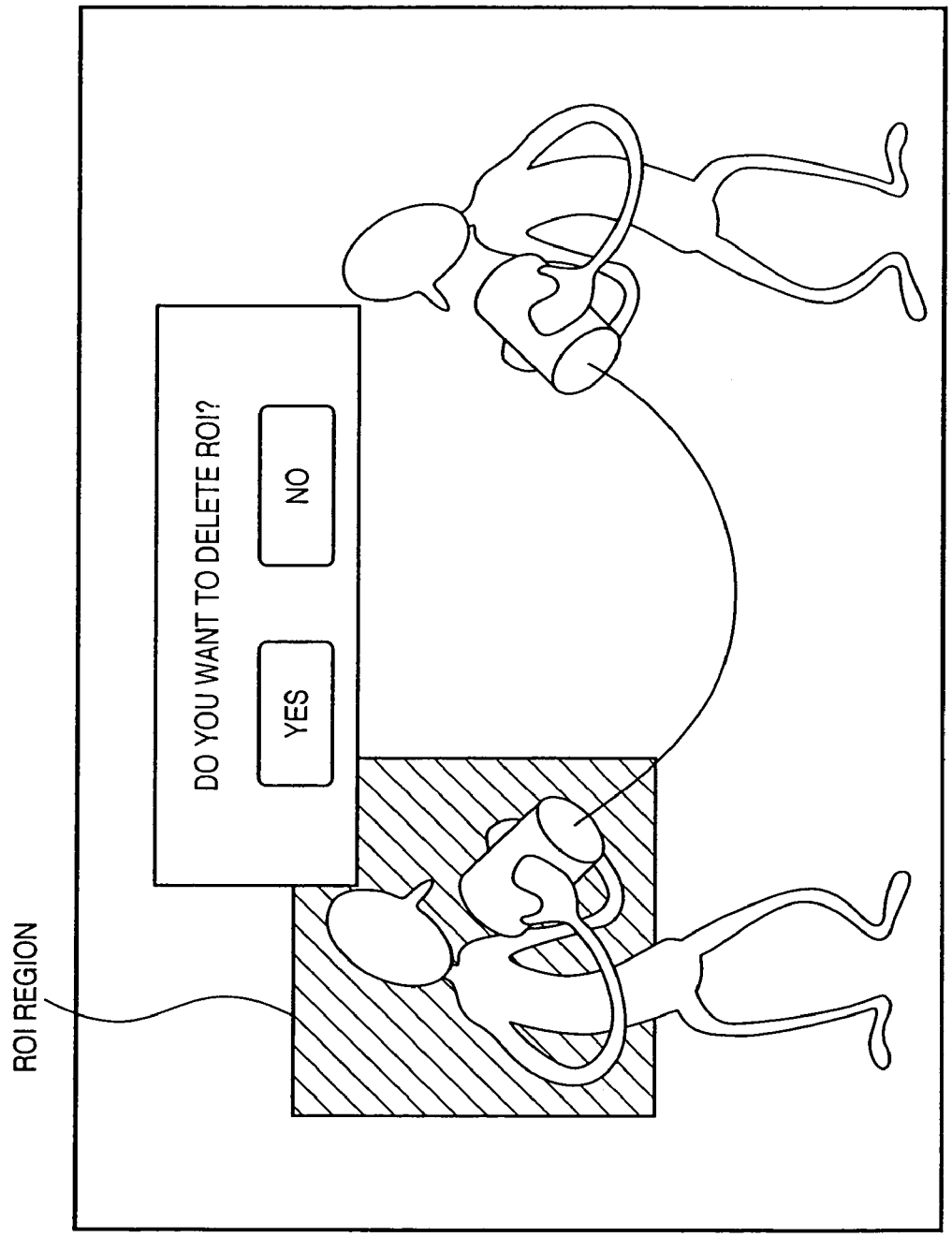
FIG. 20 is a view showing a display example at the time of deleting image data in the region of interest (ROI) according to an embodiment of the present invention.
Figure 21:
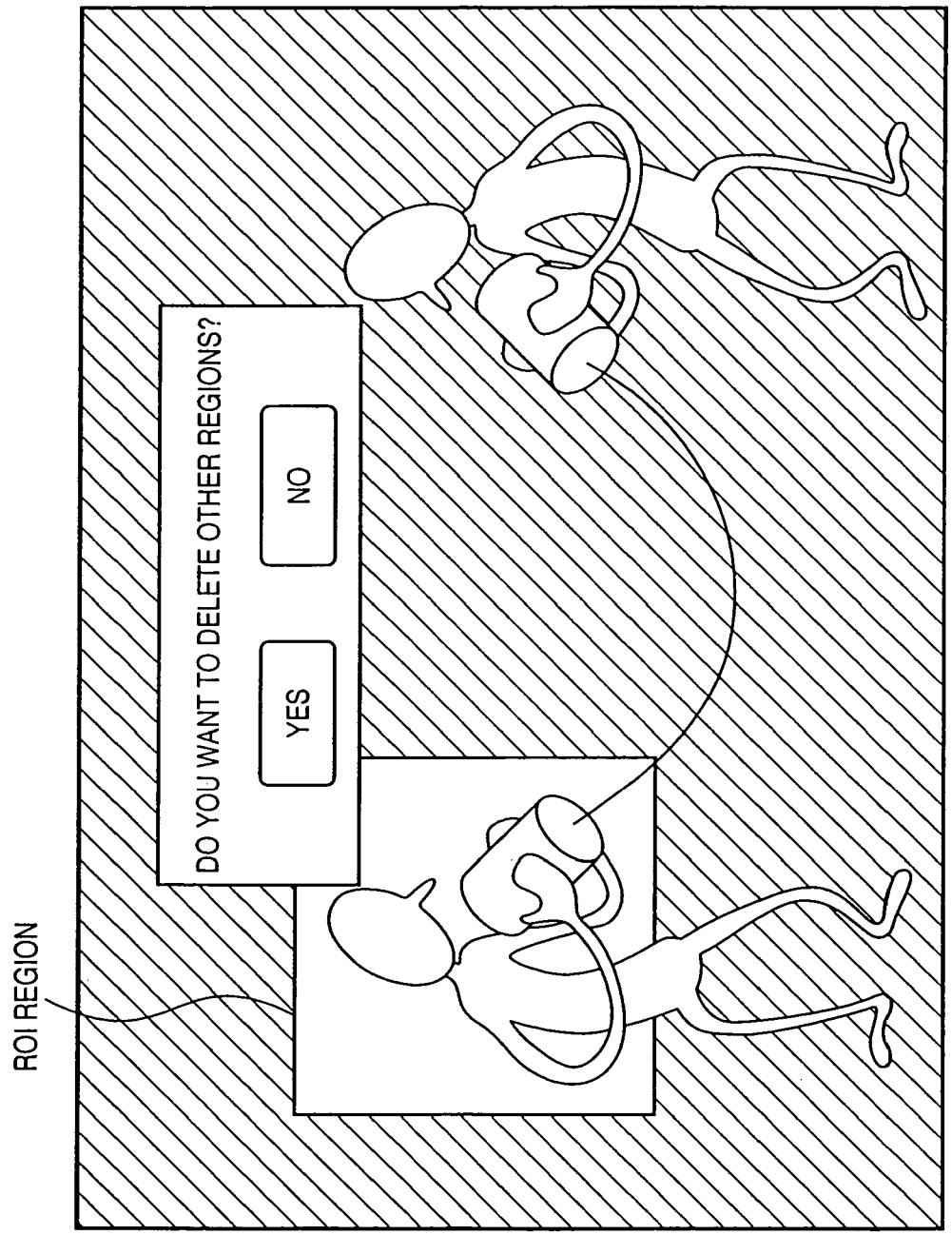
FIG. 21 is a view showing a display example at the time of deleting image data in other regions according to an embodiment of the present invention.
Figure 22:
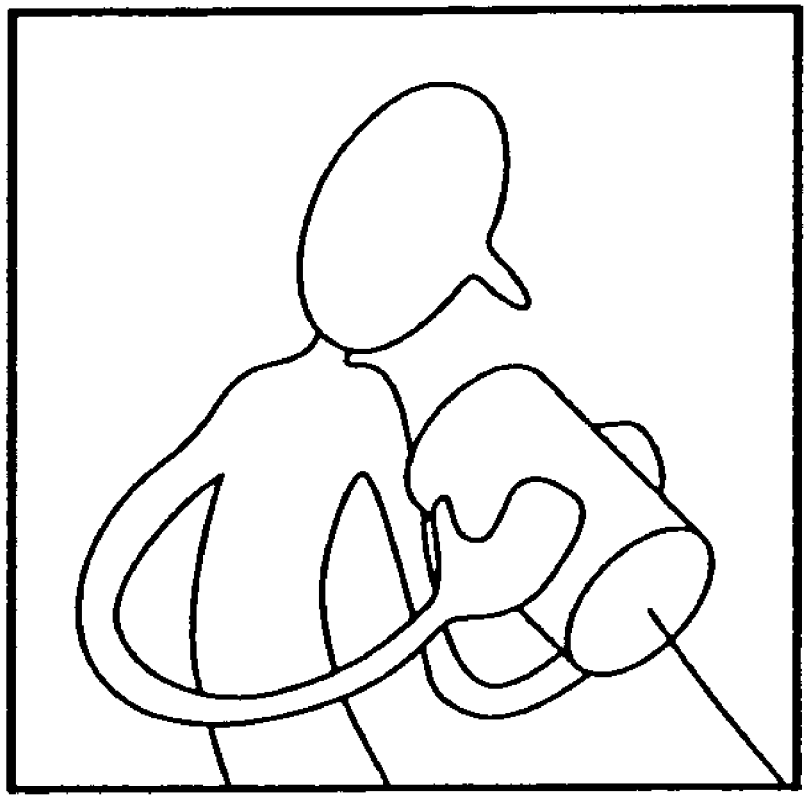
FIG. 22 is a view showing an image on which deleting in FIG. 21 is executed.

Note if the user selects to delete the ROI in FIG. 19, then again the region is clearly specified as shown in FIG. 20, and deletion is executed. If the user selects to delete the other regions (non-ROI region), the regions are clearly specified as shown in FIG. 21, then deletion is executed. If "YES" is selected in response to the inquiry in FIG. 21, ultimately only the ROI is stored as shown in FIG. 22. In other words, since the image size is reduced, the available area of the recording medium 200 increases.

Meanwhile, if it is determined in step S202 that protection has been performed on the deletion-subject image, the control proceeds to step S207 where it is determined whether or not the entire image has been protected. If it is determined that the entire image is protected, the control proceeds to step S208. In step S208, since image deletion is attempted despite the fact that the entire image is protected, a message indicating that the image cannot be deleted or a message prompting the user to cancel protection is displayed, and the control ends.

Meanwhile, if it is determined that a part of the image is protected, the image is displayed so that the non-protected region is distinguished from the protected region. Then, an inquiry is made as to whether or not the non-protected region may be deleted, and when the deletion is confirmed, the non-protected region is deleted.

Different file names are given to the image data of a plurality of ROI that have been kept as a result of the image deletion processing, and the image files are stored in the storage device. In this case, it is preferable to name the files so as to commonly include a part or the entire file name that has been given to or that is supposed to be given to the original image data before the deletion processing.

For instance, if the name of the image file before deleting region except the ROI is DSC001.aaa, file names such as DSC001_1.aaa and DSC001_2.aaa are given to the two ROI files that have been kept as a result of the image deletion processing.

This helps the user recognize that the two ROI files are made from DSC001.aaa, and the two ROI files can be associated to each other. As this manner, it is preferable to keep same leading characters of the file name and to change characters following the leading characters for each ROI.

As a result, since similar names are assigned, the two files can be displayed side by side when a list of images are displayed.

In a case where a user, does not wish a large increase in file numbers, image data other than the plurality of ROI kept as a result of image deletion processing is rewritten to zero data. As a result, it is possible to reduce image data without changing the number of files.

According to the above-described embodiment, image data can be protected and deleted, not in units of image, but in units of region set in each image. Therefore, in a case where a recording medium has no available capacity and some image data has to be deleted to increase an available area, a user can select image data protection and deletion in accordance with the situation. More specifically, if there is an unimportant image, the entire image is deleted to increase an available capacity in the recording medium. Furthermore, in an image where a ROI is set, if high-quality image data that is added to the ROI is not necessary, the shifted up bits of the high-quality image data added to the ROI can be deleted to increase an available capacity in the recording medium. Moreover, in an image where a ROI is set, if image data of the ROI only is necessary, image data of other regions can be deleted to increase an available capacity in the recording medium.

As has been described above, according to the present embodiment, it is possible to delete and protect a part of the sensed image data in accordance with a situation so as to enable efficient utilization of a finite capacity of a storage medium.

As many apparently widely different embodiments of the present invention can be made without departing from the spirit and scope thereof, it is to be understood that the invention is not limited to the specific embodiments thereof except as defined in the claims.

What is claimed is:

1. An image sensing apparatus having image sensing means and storing an image sensed by the image sensing means in a storage medium, comprising:

region designation means for designating a desired region in an image-sensible area of said image sensing means, wherein the designated desired region corresponds to a partial image;

image sensing control means for, after the desired region in the image-sensible area is designated and when an instruction for sensing a new image is inputted, controlling said image sensing means to sense and obtain an image to be stored in the storage medium;

compression-encoding means for compression-encoding the currently obtained image by said image sensing means, where an image quality of compression-encoding for the partial image within the desired region designated by said region designation means is different from that of the image other than the partial image;

storage means for storing in the storage medium the image that is compression-encoded by said compression-encoding means;

selection means for, in a case where a desired image in the storage medium to be deleted is selected and a region designated by said region designation means is included within the selected image, selecting one of the portions of the selected image in which at least an image of an area other than the partial image is included as a deletion target; and deletion means for deleting data corresponding to the deletion target region, selected by said selection means, from the storage medium.

2. The image sensing apparatus according to claim 1, wherein said compression-encoding means encodes the partial image within the region so as to achieve a high quality image having a smaller compression ratio than other region.

3. The image sensing apparatus according to claim 1, further comprising deletion protection means for setting deletion protection in an entire image of a desired image stored in the storage medium, and in a case where a desired region is set in the image, setting deletion protection inside or outside the region set in the image, wherein said deletion means deletes a region other than a deletion protection target.

4. The image sensing apparatus according to claim 1, wherein said compression-encoding means is means utilizing discrete wavelet transformation.

5. A control method of an image sensing apparatus having image sensing means and storing an image sensed by the image sensing means in a storage medium, comprising:

a region designation step of designating a desired region in an image-sensible area of said image sensing means, wherein the designated desired region corresponds to a partial image;

an image sensing control step of, after the desired region in the image-sensible area is designated and when an instruction for sensing a new image is inputted, controlling said image sensing means to sense and obtain an image to be stored in the storage medium;

a compression-encoding step of compression-encoding the currently obtained image by said image sensing means, where an image quality of compression-encoding for the partial image within the region designated in said region designation step is different from that of the image other than the partial image;

a storage step of storing in the storage medium the image that is compression-encoded in said compression-encoding step;

in a case where a desired image in the storage medium to be deleted is selected and a region designated in said region designation step is included within the selected image, a selection step of selecting one of the portions of the selected image in which at least an image of an area other than the partial image is included as a deletion target; and a deletion step of deleting data corresponding to the deletion target region, selected in said selection step, from the storage medium.

6. An image sensing apparatus having image sensing means and storing an image sensed by the image sensing means in an attachable/detachable storage medium, comprising:

region designation means for designating a desired region in an image-sensible area of said image sensing means, wherein the designated desired region corresponds to a partial image;

image sensing control means for, after the desired region in the image-sensible area is designated and when an instruction for sensing a new image is inputted, controlling said image sensing means to sense and obtain an image to be stored in the storage medium;

compression-encoding means for compression-encoding the currently obtained image by said image sensing means, where an image quality of compression-encoding for the partial image within the desired region designated by said region designation means is different from that of the image other than the partial image;

storage means for storing in the storage medium the image that is compression-encoded by said compression-encoding means; and protection setting means for, in a case where a desired image stored in the storage medium is selected and a region designated by said region designation means is included within the selected image, setting protection on one of the portions of the selected image in which at least an image of an area other than the partial image is included as a deletion prohibiting target.

7. A control method of an image sensing apparatus having image sensing means and storing an image sensed by the image sensing means in an attachable/detachable storage medium, comprising:

a region designation step of designating a desired region in an image-sensible area of said image sensing means, wherein the designated desired region corresponds to a partial image;

an image sensing control step of, after the desired region in the image-sensible area is designated and when an instruction for sensing a new image is inputted, controlling said image sensing means to sense and obtain an image to be stored in the storage medium;

a compression-encoding step of compression-encoding the currently obtained image by said image sensing means, where an image quality of compression-encoding for the partial image within the desired region designated in said region designation step is different from that of the image other than the partial image;

a storage step of storing in the storage medium the image that is compression-encoded in said compression-encoding step; and in a case where a desired image stored in the storage medium is selected and a region designated by said region designation means is included within the selected image, a protection setting step of setting protection on one of the portions of the selected image in which at least an image of an area other than the partial image is included as a deletion prohibiting target.

* * * * *